Patented June 13, 1944

2,351,302

UNITED STATES PATENT OFFICE 2,351,302

PRODUCTION OF METHYL GLYCEROL

Hanns Peter Staudinger, Ewell, and Karl Heinrich Walter Tuerck, Banstead, England, assignors to The Distillers Company Limited, Edinburgh, Scotland, a British company No Drawing. Application March 12, 1941, Serial No. 383,028. In Great Britain March 18, 1940

2 Claims. (Cl. 260—635)

The present invention relates to the production of alphamethyl glycerol (1.2.3. trihydroxy n-butane).

This compound has hitherto been obtained in the laboratory by the hydroxylation of crotonyl alcohol or alphamethyl allyl alcohol. Both of these compounds are difficult to prepare, and neither method is suitable for large-scale production.

According to the present invention a process for the production of alpha-methyl-glycerol comprises catalytically hydrogenating alpha-methyl-glyceraldehyde in alcoholic solution under pressure at a temperature between 30° C. and 120° C.

Crotonaldehyde may be converted into alpha-methyl glyceraldehyde by a number of methods such as, for example, by oxidation with osmic acid and sodium or potassium chlorate, by reacting crotonaldehyde with chlorine, water or hypochlorous acid to give alphachloro-betahydroxy-butyraldehyde, which can be hydrolysed to alphamethyl glyceraldehyde or by direct oxidation by the action of molecular oxygen in a substantially non-alkaline reaction medium.

The oxidation with osmic acid and sodium or potassium chlorate is preferably conducted in an aqueous medium at a temperature of approximately 25° C., the whole being agitated for some 5 or 6 hours. The reaction may be carried out in a shorter time at a higher temperature, e. g. for 3-4 hours at 35° C., but the reaction is not easily controlled under these conditions. At the end of the reaction the aqueous solution may be distilled "in vacuo" at a low temperature to remove water and unchanged crotonaldehyde, the sodium salts being then precipitated by the addition of alcohol. After filtering, the solution of alphamethyl glyceraldehyde in alcohol thus obtained may be used directly for hydrogenation. We have found that it is preferable not to use an excess of sodium chlorate in this method, and it is also advisable to stop the reaction before all the crotonaldehyde has reacted to avoid any tendency for the formation of crotonic acid.

The conversion of crotonaldehyde to alpha-chloro-beta-hydroxybutyraldehyde may be brought about by introducing chlorine into a saturated aqueous solution of crotonaldehyde at approximately 6° C. and separating the heavy oily layer produced. The hydrolysis of the chloro-group to the hydroxyl group is preferably carried out by means of reagents which are neutral or only slightly alkaline in reaction, as alkalies generally tend to cause resinification of the alphamethyl glyceraldehyde produced. We have found that sodium bicarbonate is a satisfactory material for this purpose although the temperature should not be allowed to rise above 50° C., and is preferably maintained at about 40° C., during the hydrolysis. Other reagents which may be used for this purpose include calcium carbonate, sodium biphosphate or sodium acetate. Yet another method of hydrolysis consists in heating an aqueous solution of alphachlorobeta-hydroxybutyraldehyde under pressure in the presence of neutral hydrolytic agents such as aluminum hydroxide or calcium carbonate.

The oxidation of the crotonaldehyde by means of molecular oxygen is carried out preferably in the presence of a small amount of water, say up to 20% by weight. Organic solvents may also be used. The reaction is carried out at temperatures below the resinification temperature of alpha-methyl glyceraldehyde i. e. below about 40° C. Catalysts may be used as they have a beneficial effect on the yields obtained and we have found that osmic acid is the most satisfactory catalyst although the compounds of the heavy metals also have a catalytic action on the reaction; other oxides which have given satisfactory results are vanadic oxide, chromic acid and molybdic acid.

The hydrogenation stage is carried out in alcoholic solution, and ethyl alcohol is a convenient solvent for this purpose. Suitable catalysts for the hydrogenation include nickel, platinum and palladium. Owing to the fact that alphamethyl glyceraldehyde decomposes rather easily on heating, the hydrogenation is carried out at as low a temperature as possible, e. g. from 30°-120° C., preferably below 100° C. In this way it is possible to reduce to a minimum the formation of coloured condensation products and other by-products. A convenient method of ascertaining when hydrogenation to alphamethyl glycerol is complete is based on the fact that alphamethyl glyceraldehyde instantly reduces cold Fehling's solution, whereas alphamethyl glycerol does not. It is not necessary to isolate the alphamethyl glyceraldehyde from the organic products of reaction before hydrogenation; we prefer to hydrogenate the residue which is obtained after neutralising and concentrating the aqueous solution "in vacuo."

The aqueous reaction medium containing alphamethyl glyceraldehyde may, however, be heated with active carbon or extracted with water-immiscible solvents to remove traces of higher condensation products.

*Example 1*

A saturated aqueous solution of crotonaldehyde was treated with chlorine at 6° C., and the resulting heavy oil layer, consisting principally of alphachloro - beta - hydroxybutyraldehyde, was separated. 250 gm. of this layer was dissolved in 1500 ccs. of water and the solution vigorously agitated whilst sodium bicarbonate was gradually added, until no further evolution of carbon dioxide could be observed. The temperature during the addition of sodium bicarbonate was maintained at 40° C. The solution was then evaporated "in vacuo" at about 30° C., and ethyl alcohol added to the residue. After filtration the solution was mixed with 10 gms. of active nickel catalyst and hydrogenated at 120 atmospheres pressure in a stirring autoclave, the temperature being slowly raised until active absorption of hydrogen was observed. This occurred between 60° and 80° C. The product obtained, after distilling off ethyl alcohol, consisted chiefly of alphamethyl glycerol B. P. 165° C./15 mm.

*Example 2*

70 gms. of crotonaldehyde were stirred into a solution of 30 gms. of sodium chlorate in 200 ccs. of water containing also 1 cc. of a 1% solution of osmic acid. The temperature was maintained at approximately 25° C. for about five hours, the whole being agitated throughout this time. The residue was filtered and the aqueous solution concentrated at 30° C. "in vacuo." Alcohol was then added to the residue and the precipitated sodium salts filtered off. The alcoholic solution, which contained about 72 gms. of alphamethyl glyceraldehyde was hydrogenated at 35° C. at a hydrogen pressure of 50 atmospheres, using palladium chloride as catalyst, till the solution no longer gave a positive reaction for alphamethyl glyceraldehyde with cold Fehling's solution. A good yield of alphamethyl glycerol was obtained from the reaction products.

What we claim is:

1. The manufacture of alphamethylglycerol from the reaction mixture obtained by the oxidation of crotonaldehyde in the presence of water and at a temperature below about 40° C. and containing alphamethylglyceraldehyde, which comprises subjecting said reaction mixture to hydrogenation by treatment in the presence of alcohol with hydrogen under superatmospheric pressure and at a temperature not in excess of 100° C. and in the presence of a hydrogenation catalyst, and recovering the alphamethylglycerol so formed.

2. A process according to claim 1 wherein the hydrogenation is effected in the presence of a catalyst of the class consisting of nickel, platinum and palladium.

HANNS PETER STAUDINGER.
KARL HEINRICH WALTER TUERCK.